US008231284B2

(12) United States Patent
Doany et al.

(10) Patent No.: US 8,231,284 B2
(45) Date of Patent: Jul. 31, 2012

(54) ULTRA-HIGH BANDWIDTH, MULTIPLE-CHANNEL FULL-DUPLEX, SINGLE-CHIP CMOS OPTICAL TRANSCEIVER

(75) Inventors: Fuad Doany, Katonah, NY (US); Clint L. Schow, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1496 days.

(21) Appl. No.: 11/691,303

(22) Filed: Mar. 26, 2007

(65) Prior Publication Data
US 2012/0163811 A1 Jun. 28, 2012

(51) Int. Cl.
G02B 6/36 (2006.01)
G02B 6/43 (2006.01)
G02B 6/32 (2006.01)
G02B 6/12 (2006.01)

(52) U.S. Cl. .................. 385/92; 385/14; 385/33

(58) Field of Classification Search .............. 385/92
See application file for complete search history.

(56) References Cited

U.S. PATENT DOCUMENTS

| 6,641,310 B2* | 11/2003 | Williams | 385/92 |
| 6,754,407 B2* | 6/2004 | Chakravorty et al. | 385/14 |
| 2005/0135732 A1* | 6/2005 | Crow et al. | 385/15 |

OTHER PUBLICATIONS

Schares, L. et al., "Terabus: Terabit/Second-Class Card-Level Optical Interconnect Technologies," Selected Topics in Quantum Electronics, IEEE Journal of, vol. 12, No. 5, pp. 1032-1044, Sep.-Oct. 2006.*

Ali et al., "Demonstration of a high-density parallel-WDM optical interconnect", Agilent Laboratories, Palo Alto, CA, 0-7803-8557-08/04, 2004 IEEE, pp. 459-460.
Lemoff et al., "Demonstration of a Compact Low-Power 250-Gb/s Parallel-WDM Optical Interconnect", IEEE Photonics Technology Letters, vol. 17, No. 1, Jan. 2005, pp. 220-222.
Lemoff et al., "MAUI: Enabling Fiber-to-the-Processor With Parallel Multiwavelength Optical Interconnects", Journal of Lightwave Technology, vol. 22, No. 9, Sep. 2004, pp. 2043-2054.
POP4MSA pluggable transceiver, Four Channel Pluggable Optical Transceiver Multi-Source Agreement, POP4 MSA, Technical Specification Revision 1.0, www.popoptics.org., Sep. 4, 2002, pp. 1-14.
Liboiron-Ladouceur et al., "A 17 Gb/s, 200-meter Multimode Optical Fiber Link usign CMOS Analog ICs and Silicon Carrier Packaging", IBM T.J. Watson Research Center, Yorktown Heights, NY 10598, USA, Published in Lasers and Electro-Optics Society, 2006, pp. 573-574, Oct. 2006.

* cited by examiner

*Primary Examiner* — Omar Rojas
(74) *Attorney, Agent, or Firm* — Scully, Scott, Murphy & Presser, P.C.; Daniel P. Morris, Esq.

(57) ABSTRACT

A novel parallel optical module having combined optical signal transmit and receive function for high-speed performance. The optical module includes a plurality, e.g., sixteen 10-Gb/s transmitter and receiver channels for a 160-Gb/s bidirectional aggregate data rate. The module utilizes a single-chip CMOS optical transceiver containing both transmitter and receiver circuits. 16-channel high-speed photodiode (PD) and VCSEL arrays are flip-chip attached to the low-power CMOS IC. The substrate emitting/illuminated VCSEL and PD arrays operate at 985 nm and include collimating lenses integrated into the backside of the substrate. The IC-OE assembly is then flip-chip attached to a high density organic package forming the transceiver optical module. The exclusive use of flip-chip packaging for both the IC-to-optoelectronic (OE) devices and for the IC-to-organic package minimizes the module footprint and associated packaging parasitics.

24 Claims, 7 Drawing Sheets

ULTRA-HIGH BANDWIDTH, MULTIPLE-CHANNEL FULL-DUPLEX, SINGLE-CHIP CMOS OPTICAL TRANSCEIVER

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. MDA972-03-3-0004 awarded by the Defense Advanced Research Projects Agency.

BACKGROUND OF THE INVENTION

1. Field of the Invention

The present invention relates generally to optical transceiver devices, and particularly, an optical transceiver device exhibiting improved frequency and power consumption characteristics for board-level, high-bandwidth interconnects for high-end computing systems.

2. Description of the Prior Art

Interconnect bandwidth requirements within high-performance computing and switch/router systems continue to increase, driven by increasing processor speeds, more processors per system, and wider high-speed data buses. Parallel optical links between modules on the same circuit board or between boards through a backplane hold the promise of simultaneously optimizing critical interconnect parameters: data throughput, density, power consumption, and latency. Optics can also potentially support longer link lengths than electrical interconnects.

As described in L. Schares et al., "Terabus: Tb/s-class card-level optical interconnect technologies," IEEE J. Select. Topics Quantum Electron, Special Issue on Optoelectronic Packaging, Vol. 12, No. 5, September/October 2006, there currently exists the Terabus program that aims in developing technologies for high-speed, dense, low-power inter-chip optical interconnects using printed circuit boards with integrated optical waveguides.

One current implementation of the Terabus architecture particularly incorporates 985 nm optoelectronic components (OEs), with the OE being flip-chip attached to the IC, and the ICs being "flip-chip" attached to an underlying Silicon carrier (SC). FIG. 1 illustrates the Silicon carrier performing multiple functions including: 1) a packaging platform for connecting the IC-OE assembly to an underlying printed circuit board (PCB), 2) a function for routing the high-speed inputs/outputs of the transmitters/receivers from the top of the carrier through vias to the bottom surface for connection to the host circuit board; and, 3) a function for providing an optical through hole that allow low-loss optical coupling to waveguides fabricated on an underlying printed circuit board (PCB). The actual link 10 depicted in FIG. 1, is shown in demonstrate key points including: the capability of the SC technology to connect OEs to ICs through relatively long transmission lines with relatively no or minimal impact on their high-speed operating performance; and, 2) the ability of CMOS analog front-end circuits to enable low-cost and low-power fiber-optic data interconnects.

In the architecture described in the above-mentioned L. Schares et al. reference, as shown in FIG. 1, the link 10 consists of a separate transmitter assembly 15 comprising silicon carrier (SC) 17 attached to CMOS laser diode driver (LDD) 18. An open cavity fabricated in the silicon carrier accommodates the direct attachment of a 985 nm Vertical-Cavity Surface-Emitting Laser (VCSEL) 19 to the CMOS laser diode driver (LDD). The light output of VCSEL 19 is launched into optical waveguides 20 fabricated on printed circuit board (PCB), the output of which is coupled to a photodiode (PD) 25 within a separate receiver assembly 30. The receiver assembly 30 comprises a silicon carrier (SC) 23, similar to the transmitter SC 17, however, attached to CMOS receiver IC 24, which is attached to PD 25.

In the architecture depicted in FIG. 1, the separated transmitter IC 18 and receiver IC 24 were fabricated in the IBM CMOS 8RF-LM technology, an industrial 0.13 µm process such as described in the reference to Kucharski et al. entitled "A 20 Gb/s VCSEL driver with pre-emphasis and regulated output impedance in 0.13 um CMOS," IEEE ISSCC, pp. 222-223, February 2005. The core circuitry of both ICs occupies an area of 250 µm×350 µm. The laser diode driver (LDD) consumes 100 mW from 3.3 V (used to supply the VCSEL bias) and 2 V (used for the core circuitry) power supplies. The receiver IC consists of a TIA with a 5-stage post amplifier (PA) followed by a buffer as is fully described in the reference to C. L. Schow et al. entitled "A 15-Gb/s, 2.4-V Optical Receiver Using a Ge-on-SOI Photodiode and a CMOS IC," IEEE Photon. Technol. Lett., in press. With a supply voltage of 2.2 V, the 3 dB bandwidth is 6.6 GHz and it consumes 70 mW at 10 Gb/s.

However, notwithstanding the efforts of the Terabus program, it would be highly desirable to provide a single-chip version of the optical interconnect that includes a single optical transceiver device capable of providing a plurality of transmitter channels and a plurality of receiver channels with each channel achieving data rates in excess of 10 Gb/s and, further, achieves extremely high area efficiency as compared with any parallel optical transmitter, receiver, or transceiver currently available.

SUMMARY OF THE INVENTION

The present invention is directed to a single-chip, optical transceiver component for high-bandwidth applications.

More particularly, the invention is directed to a single-chip CMOS transceiver module that supports an aggregate data rate in excess of about 160 Gb/s with sixteen receiver and sixteen transmitter channels that each operate at about 10 Gb/s with significant margin. The transceiver assembly occupies an area of about 17 mm$^2$ and consumes a total of about 2.5 W. At 10 Gb/s/channel, the power consumption per complete link (transmitter and receiver combined) is about 15 mW/Gb/s.

Thus, according to one aspect of the present invention, there is provided a single-chip transceiver device capable of channel rates in excess of 10 Gb/s and achieving the highest area efficiency (about 9.4 Gb/s/mm$^2$) of any parallel optical transmitter, receiver, or transceiver reported to-date.

More particularly, there is provided an optical transceiver apparatus for processing high speed optical signals. The apparatus comprises:

an optoelectronic (OE) module comprising a first array of optical signal detector devices for receiving optical signals from an optical signal carrying device, and a second array of optical signal emitting devices for generating optical signals for output to an optical signal carrying device; and, a single integrated circuit (IC) including a transceiver having a first array of receiver/amplifier circuits adapted for receiving and amplifying the detected optical signals, and a second array of driver circuits for use in generating optical signals for output transmission, the optoelectronic module flip-chip attached to the single integrated circuit to form an IC-OE assembly having combined optical signal transmit and receive function, wherein the optical transceiver apparatus is of reduced footprint and exhibits enhanced bidirectional data rates.

Further to this embodiment, the optical transceiver apparatus further comprises: a chip carrier assembly for flip-chip mounting the IC-OE assembly to form the optical transceiver apparatus, the flip-chip mounting providing electrical contacts from the IC to the chip carrier.

Further to this embodiment, the first array of optical signal detector devices comprises an array of photodetector (PD) elements for receiving the optical signals. Preferably, the PD element is formed on a substrate that is transparent to the signal wavelength.

Further to this embodiment, the second array of optical signal emitting devices comprises an array of Vertical-Cavity Surface-Emitting Laser (VCSEL) elements for generating the optical signals. Preferably, the VCSEL elements are formed on a substrate that is transparent to the signal wavelength.

In one embodiment, a lens array is integrated into the transparent substrate of the VCSEL on the surface opposite the VCSEL devices, and with lens elements corresponding to each VCSEL device.

Likewise, in another embodiment, a lens array is integrated into the transparent substrate of the photodiode, with lens elements corresponding to each photodiode device.

In one embodiment, the substrate emitting/illuminated VCSEL and PD arrays operate at 985 nm, however, dependent upon the substrate materials may operate at a range of light frequencies from infrared (IR) to ultraviolet (UV) range.

Advantageously, the optical transceiver device of the invention may be utilized with a chip carrier assembly configured for coupling light signals to/from an optical signal carrying device such as a circuit card having optical waveguides or, having an optical fiber array. Moreover, the single IC transceiver architecture having both optical transmit and optical channels receivers provides more functionality and higher level of integration. The carrier is lower cost and packaging is also less costly due to relaxed alignment tolerances.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

The present invention is directed to a single-chip, CMOS optical transceiver that utilizes technology including: 1) high-speed, low-power CMOS analog amplifier circuits, 2) efficient, high-speed substrate illuminated/emitting photodiode (PD) and VCSEL arrays that operate at 985 nm; and, 3) exclusive use of flip-chip packaging to minimize both the module footprint and associated packaging parasitics.

Figure 1:
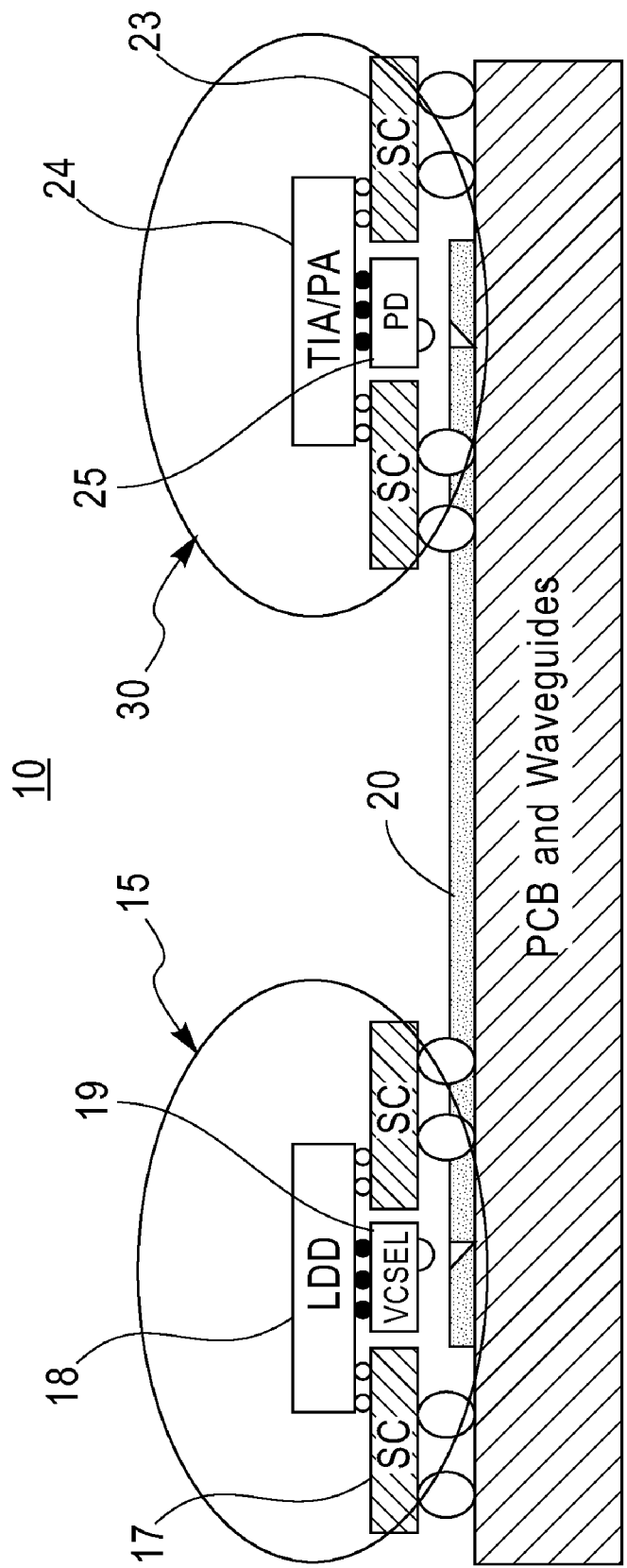
FIG. 1 illustrates a prior-art Terabus architecture particularly incorporating 985 nm optoelectronic components (OEs), with ICs and OEs being "flip-chip" attached to an underlying Silicon carrier (SC)
Figure 2:
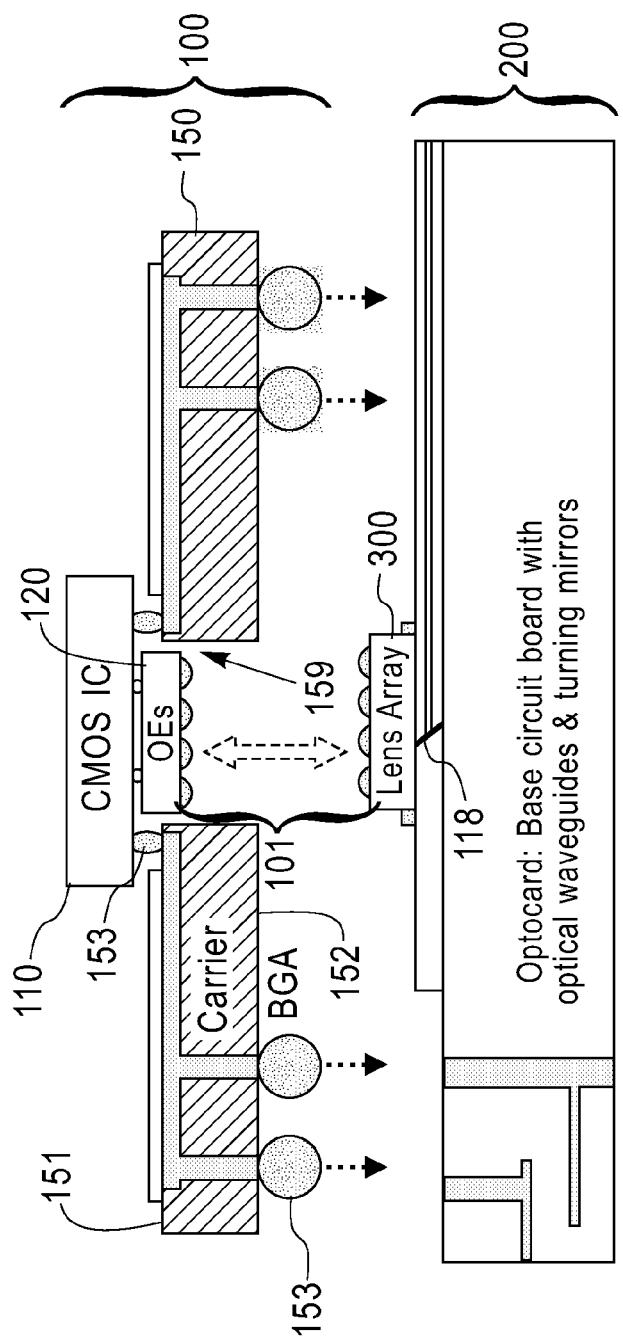
FIG. 2 depicts a side plan view of the complete transceiver package 100 including the assembled CMOS optical transceiver module 110 of the invention and a flip-chip attached OE module 120 comprising both PD and VCSEL arrays with integrated backside lenses.

FIG. 2 depicts a side plan view of the complete transceiver package including the assembled CMOS optical transceiver module 110 of the invention and a flip-chip attached OE module 120 comprising both PD and VCSEL arrays with integrated backside lenses (as well as assembly alignment features). The OE module 120 flip-chip attached to the optical transceiver module 110 is assembled using conventional chip attachment processes as described in E. M. Davis, W. E. Harding, R. S. Schwartz, J. J. Corning, "Solid Logic Technology: Versatile High Performance Microelectronics," IBM Journal of Research and Development, p. 102, 1964, incorporated by reference as if fully set forth herein. As shown in FIG. 2, the optical transceiver module 110 having the flip-chip attached OE module 120 is mounted directly onto an organic chip carrier 150 to form the transceiver optical module "optomodule" 100 that is subsequently attached to a circuit board 200 (alternately referred to as "Optocard") with integrated optical waveguides.

More particularly, the OE arrays are flip-chip attached to the CMOS IC, which is then flip-chip attached to the organic laminated high density circuit card or "carrier" 150 to form the optomodule 100 which can then be directly surface mounted to an FR4 circuit board 200 with integrated waveguides 117 to simultaneously provide the electrical and optical interconnection. A ball grid array (BGA) solder process similar to that used for conventional chip-carriers provides the electrical contacts while a lens array incorporated onto the waveguides provides the optical connectivity.

In one embodiment, the optomodule carrier 150 is assembled directly onto an organic circuit board 200 having integrated waveguides (Optocard), that, in one embodiment, incorporates 32-channel polymer waveguides 117 on a 62.5-μm pitch, for example, with core dimensions 35 μm×35 μm, for example. It is understood that the invention is not so limited to 16 transmit/16 receive channels, thus, the Optocard 200 may incorporate less than or more than 32-channel polymer waveguides. Moreover, as will be described in greater detail herein with respect to FIG. 7, the Optocard 200 may incorporate a 32-channel fiber optic array with corresponding focusing lenses.

Figure 3A:
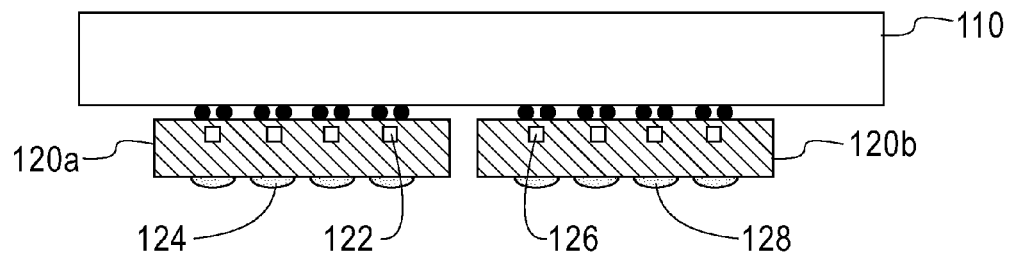
FIGS. 3A and 3B depict respective edge and top views of the transceiver IC 110 with flip-chip attached OE module 120.
Figure 3B:
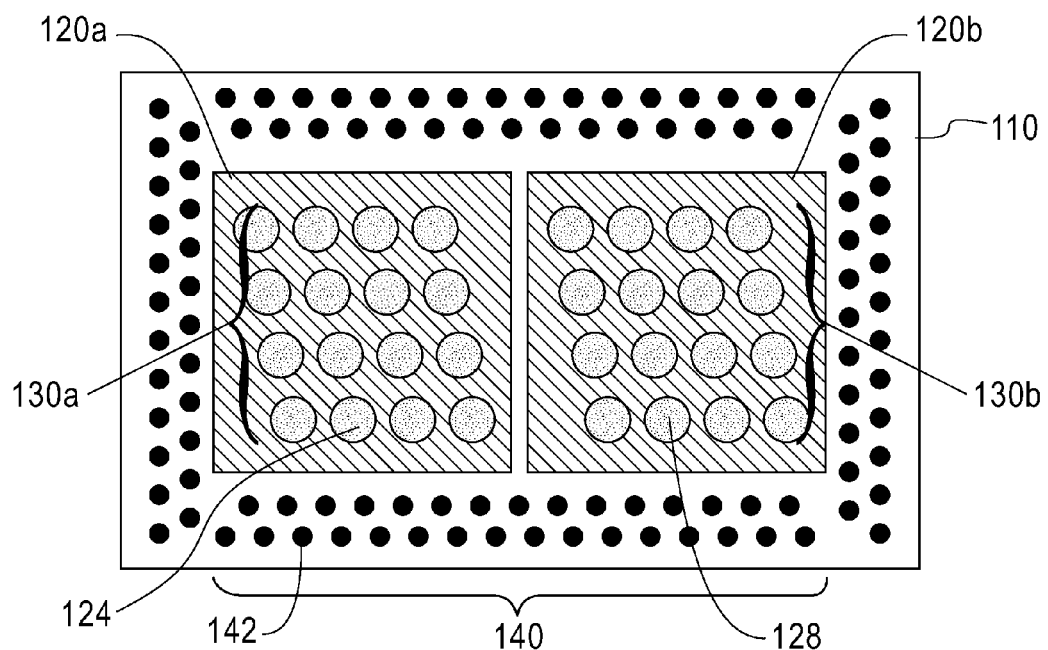

FIGS. 3A and 3B depict respective edge and top views of the transceiver IC 110 with flip-chip attached OE module 120.

As shown in FIGS. 3A and 3B, the OE module 120 comprises two separate arrays of optoelectronic components, a laser diode array, e.g., VCSEL array 120a, comprising a two-dimensional (2-D) array of VCSEL elements 122 each configured to have a respective focusing lens 124 of a lens array 130a for coupling optical signals to a waveguide array, and, an array of photodetectors, e.g., photodiode array 120b, comprising a two-dimensional (2-D) array of photodiode elements 126 each configured to have a respective focusing lens 128 of a lens array 130b for receiving optical signals from a waveguide array. The photodetector device, e.g., photodiode 126, of the photodiode array 120b is formed on a substrate that is transparent to the signal wavelength, and in one non-limiting example, may include InP or GaAs or like transparent semiconductor material. Similarly, the laser diode device, e.g., VCSEL 122 of the laser diode driver array 120a is formed on a substrate that is transparent to the signal wavelength, and in one non-limiting example, may include InP or GaAs or like transparent semiconductor material.

Furthermore, the transparent substrate may be glass or plastic material. In one embodiment, laser diode devices on thinned semiconductor substrates or photodiode devices on thinned semiconductor substrates, are attached to the glass or plastic substrate. In this embodiment, the VCSEL or photodiode devices are transferred to the glass or plastic substrate following their fabrication on a semiconductor substrate. The fabrication process involves, first the fabrication of the VCSEL devices on the typical semiconductor substrate, such as GaAs or InP. As in typical semiconductor fabrication processes, the VCSEL active devices are formed within a thin epitaxial layer on the semiconductor substrate. The device layer is then attached to the glass or plastic substrate, and the semiconductor substrate is removed by a polishing or chemical means. This fabrication process produces a thin layer of active VCSEL devices on the glass or plastic substrate. Photodiode devices on glass or plastic substrates can also be fabricated in a similar process. In this embodiment, the signal wavelength is not limited to wavelengths where the semiconductor substrate is transparent. For example, a glass substrate, including fused silica, can be transparent to wavelengths from infrared (IR) to the ultraviolet (LTV).

Figure 4A:
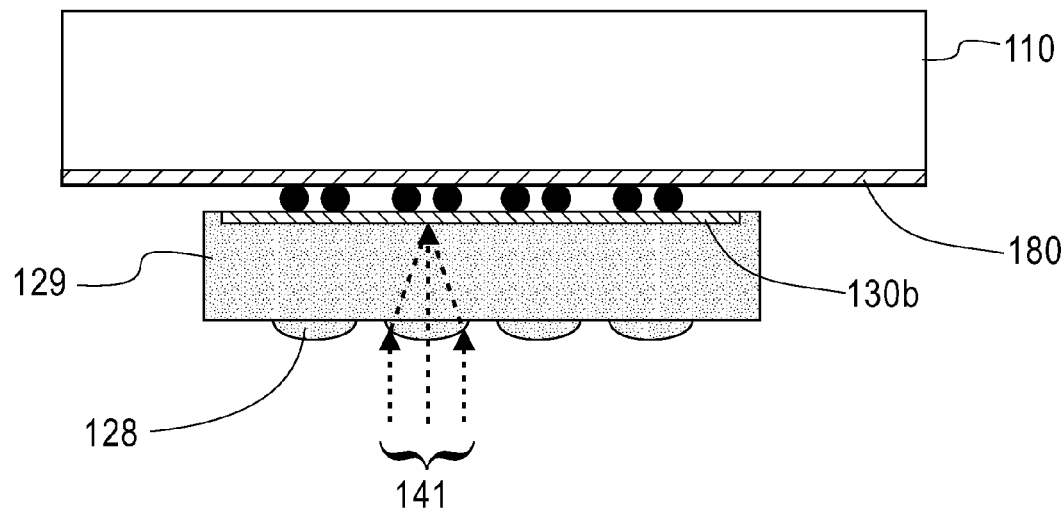
FIG. 4A is a detailed depiction of each focusing lens 128 of a lens array 130b integrated into the backside of the transparent OE substrate 129 dimensioned for focusing received optical signals (light) onto the OE photodetection element.
Figure 4B:
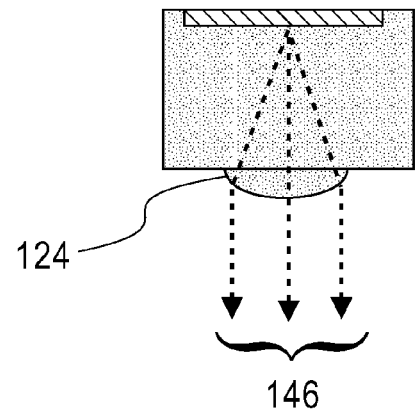
FIG. 4B is a detailed depiction of a focusing lens 128 of a lens array 130a integrated into the backside of the transparent OE substrate 129 dimensioned for collimating light output from the OE laser diode element.

As shown in FIG. 4A, each focusing lens 128 of a lens array 130b is integrated into the backside of the transparent OE substrate 129 and is dimensioned for focusing received optical signals (light) 141 onto the OE component, in this case, the photodiode 126 of the OE array 120b. Similarly, as shown in FIG. 4B, each focusing lens 128 of a lens array 130a is integrated into the backside of the transparent OE substrate 129 and is dimensioned for collimating light output 146 from the OE laser diode 126 of the OE array 120a.

Returning back to FIG. 3B, the lens arrays 130a, 130b each comprise a 4×4 array in a staggered 2-D lens array configuration and array pitch compatible for coupling to a waveguide array, or alternately to optical fiber. Thus, the optomodule provides sixteen (16) optical signal receive channels and sixteen optical signal transmit channels for communication. However, it is understood that the invention is not so limited. For example, the arrays may be configured in a uniform (non-staggered) configuration and may comprise more or less array elements depending upon the application or intended use and/or design considerations. Additionally shown in FIG. 3B, formed on the transceiver IC 110 are a plurality 140 of electrical bonding pads 142, e.g., comprising individual solder connections for electrically coupling I/O, power and control signals to the carrier 150 and optoelectronic arrays 120a, 120b. For instance, the following voltages may be applied to the core circuits including, but not limited to: 1.8 V for the LDDs, 2.0 V RX circuits, and 2.8 V for the LDD output stages, for example, to accommodate the approximately 1.5V built-in voltage drop across the VCSELs. The total core power consumption, including both transmitter and receiver, is 2.5 W, in the exemplary embodiment depicted.

As will be explained in greater detail hereinbelow, the flip-chip mounting of the IC-OE assembly to the carrier provides electrical contacts for enabling signal communication between the IC to the carrier.

Figure 5:
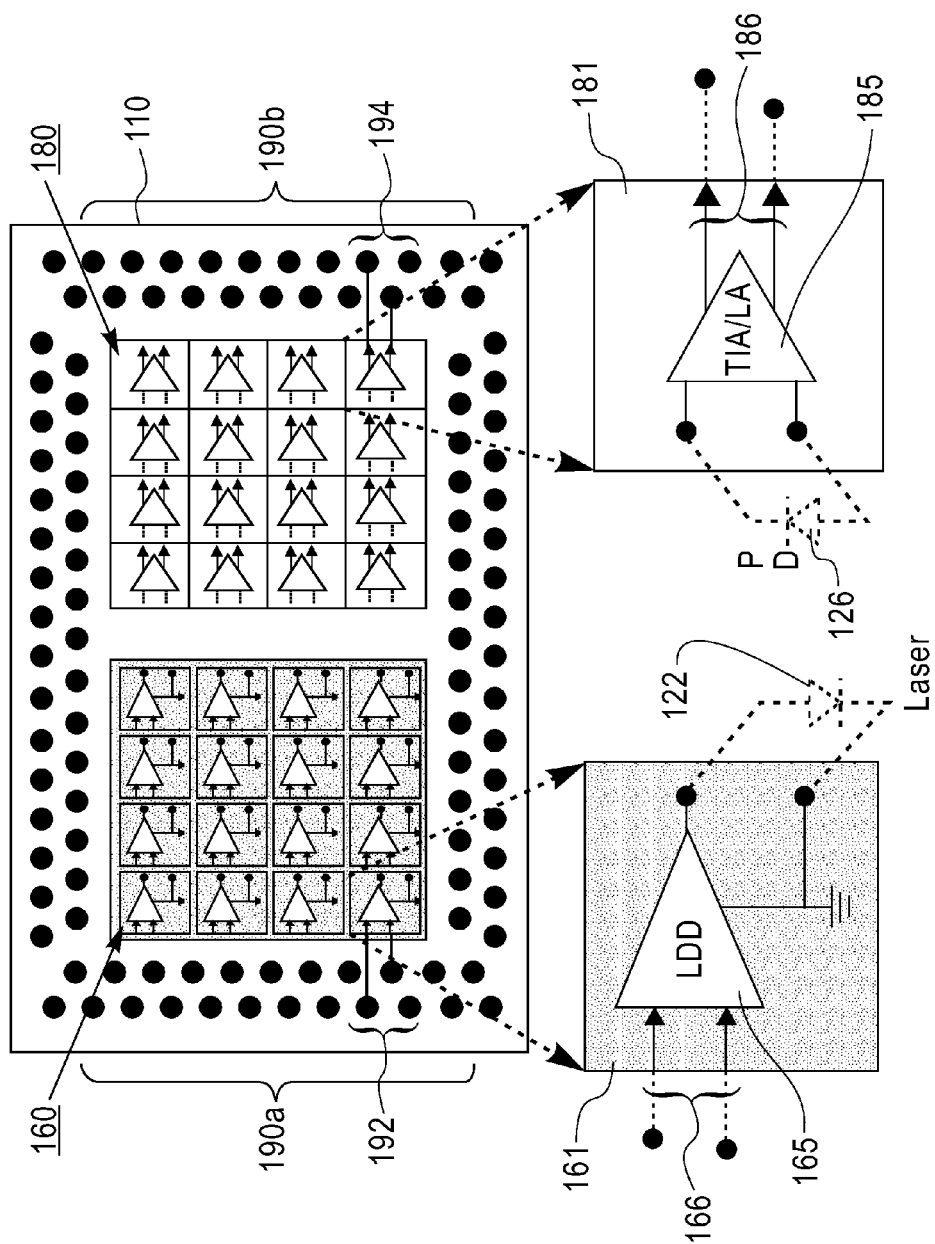
FIG. 5 depicts a conceptual block diagram of the transceiver IC 110 of the optomodule 100.

FIG. 5 depicts a conceptual block diagram of the transceiver IC 110 of the optomodule 100. As shown in FIG. 5, the IC 110 includes a two-dimensional laser driver array 160 and a proximately located two-dimensional receiver/amplifier array 180. FIG. 5 further illustrates a detailed view of an individual laser diode driver circuit 161 of the laser driver array 160 that includes a laser diode driver having outputs electrically connected to an individual laser diode element, e.g., VCSEL element 122 of the VCSEL array 120a, for generating an optical signal for transmission therefrom. Likewise, FIG. 4 illustrates a detailed view of an amplifier circuit 181 of the receiver/amplifier array 180 that includes a transimpedance/limiting amplifier circuit 185 having inputs electrically connected to an individual photodetector element, e.g., photodiode 126 of the PD array 120b, for receiving/amplifying signals as detected by the photodiode.

As further shown in FIG. 5, formed on the opposing edges of transceiver IC 110 are respective pluralities 190a, 190b of electrical bonding pads 142, e.g., comprising individual solder connections for electrically coupling signals between the IC and carrier 150 (FIG. 2). For example, with respect to each laser diode driver circuit 161 of the laser driver array 160 shown in FIG. 5, two bonding pads 192 are conductively coupled to the input of each driver circuit 161 for providing laser diode driving signals 166. These input drive signals 166 may be generated off chip, and may be received at the laser driver array 160 via the carrier by virtue of the flip-chip connection between the IC-OE assembly and the carrier (FIG. 2). In a similar manner, with respect to each receiver/amplifier circuit 181 of the receiver/amplifier array 180 shown in FIG. 5, two bonding pads 194 are conductively coupled to the output of each amplifier circuit 181 for providing the electronic signals 186 corresponding to the received optical signals at the photodetector (e.g., photodiode 126). These output signals 186 may be communicated from the receiver/amplifier array 180 to the carrier by virtue of the flip-chip connection between the IC-OE assembly and the carrier (FIG. 2). It is understood that while input drive signals 166 and detected output signals 186 are differential, e.g., may be opposite polarity signals, they may be only one signal input or output dependent upon the applications and configuration of the arrayed elements in respective OE arrays 120a, 120b.

Figure 6:
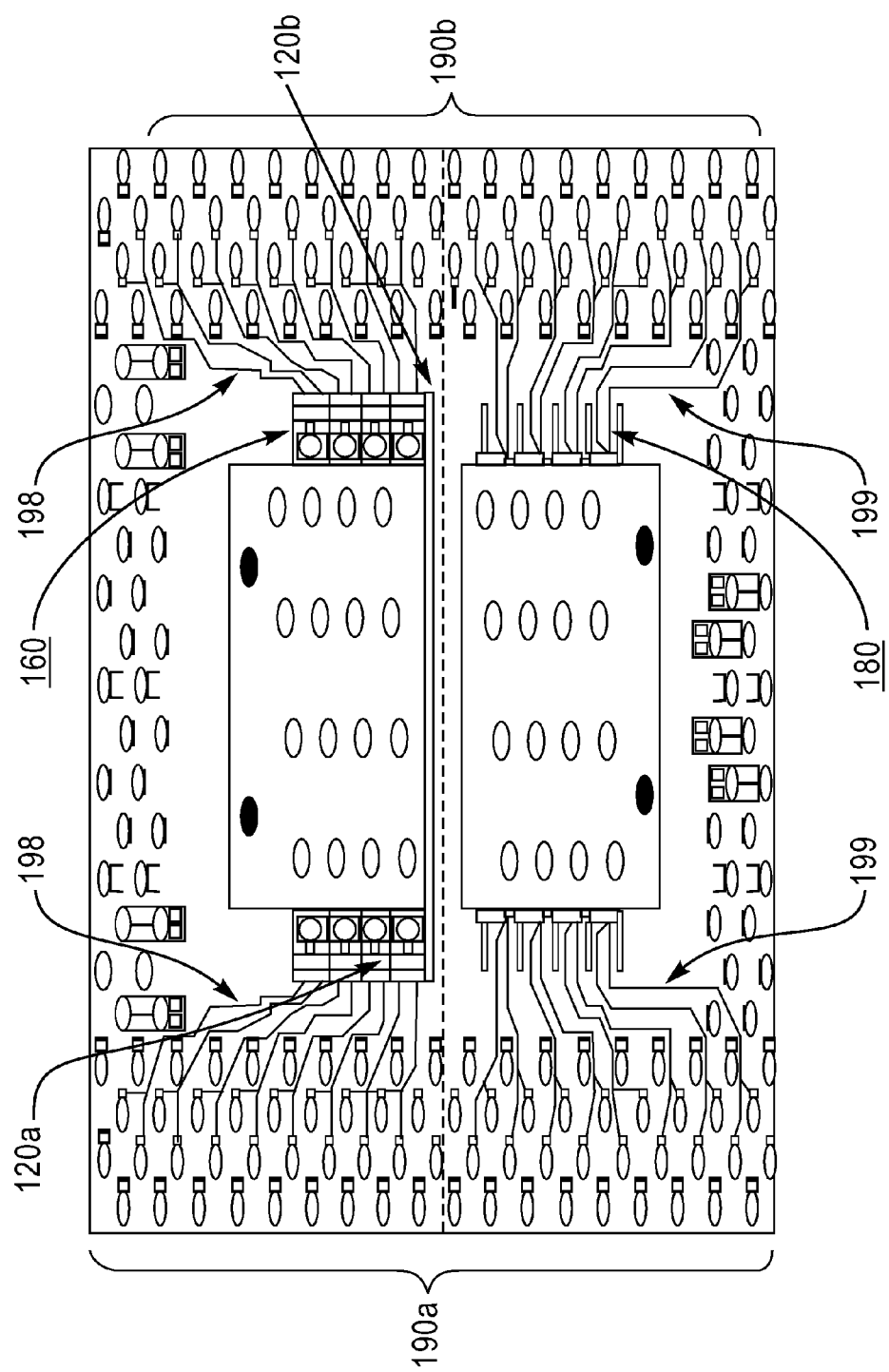
FIG. 6 depicts an internal, micrographic view showing an example embodiment of a 16 plus 16 channel transceiver IC 110 of the optomodule 100 including flip-chip connected 4 by 4 OE laser diode array 120a and 4×4 photodiode array 120b; and, FIG. 7 depicts an alternative embodiment where the Optomodule 100 of the invention is a fiber-coupled transceiver 100' where lenses transfer light from the OE devices to optical fibers.

FIG. 6 depicts an internal, micrographic view showing an example embodiment of a 16+16 channel transceiver IC 110 of the optomodule 100 including flip-chip connected OE laser diode array 120a, photodiode array 120b. FIG. 6 particularly depicts the provision of transmission lines 198 leading from the respective 2-D driver array 160 to peripheral bond pads 190a, 190b and, transmission lines 199 leading from respective 2-D receiver/amplifier array 180 to the peripheral bond pads 190a, 190b.

Architecture of CMOS Transceiver Chip

An example transceiver IC 110 was fabricated by IBM Corporation using 0.13-μm CMOS technology, and included sixteen independent laser-diode driver (LDD) circuits and sixteen receiver/amplifier (RX) circuits arrayed in two separate 4×4 blocks with a 250-μm×350-μm pitch. Differential 100-Ω microstrip transmission lines are provided that connect the inputs (outputs) of the LDD (RX) circuits to bond pads arranged on the long sides of the transceiver chip in a GSSG configuration. The 100-μm diameter pads on a 200-μm pitch are compatible with current high-volume industrial flip-chip attachment such as the IBM C-4 process, as described in E. M. Davis, et al. This pad configuration additionally allows all channels to be characterized using standard co-planar microwave probes at the IC level. In one embodiment, power and control signals for the transmitter and receiver sections of the chip are connected to bond pads at the short edges of the chip. In one embodiment, the transceiver chip measures 5.25 mm by 3.25 mm. The optical transceiver 110 in the described embodiment is designed for use in conjunction with the 985-nm OE elements, however this is dependent upon the transparent substrate material (optical response) upon which the OE elements are formed. The TX or RX portion of the transceivers utilize 16 channels: 4×4 OE arrays. It is understood that a 500-μm separation between the TX and RX portions of the transceiver is sufficient to minimize TX-RX crosstalk and allow for dicing tolerance, however, this degree of separation is configurable.

Although not explicitly shown in the figures, a multi-step assembly process of the Optomodule 110 is now described: In an example embodiment, the OEs are provided with Au pads that are bonded to the IC bond pads using Eutectic AuSn (e.g., 80% Au, 20% Sn) solder deposited on the IC pads. The melting temperature of eutectic AuSn is about 278° C. during reflow and >400° C. after reflow. This enabled the sequential flip-chip attachment of the OEs to the IC. The IC 110 was subsequently flip-chip attached to the carrier 150 using eutectic SnPb (e.g., 63% Sn, 37% Pb) solder with a melting temperature of 183° C. As known to skilled artisans, underfill may be applied to the IC-carrier solder interface to enable future BGA attachment of the Optomodule 100 to the Optocard 200 using eutectic SnPb solder.

Referring back to FIG. 6 particularly, the OE-IC assembly comprising the 4×4 PD and VCSEL arrays 120a, 120b is flip-chip attached to the center of IC. The configuration of lenses 124, 128 in respective arrays 130a, 130b that are integrated into the backside of the respective InP (PD) and GaAs (VCSEL) substrates have a lens pitch that is the same 250-μm×350-μm pitch as in the IC. A small offset, e.g., 62.5-μm, may be applied to each row in the 350-μm direction to allow the 2-dimensional array of OE devices to be coupled to a 1-dimensional array of waveguides on a 62.5-μm pitch, for example.

Returning to FIG. 2, the carrier 150 is designed to provide high density bond pads 153 on the top surface 151 for attachment to the IC (e.g., 100-μm pads on a 200-μm pitch) and standard BGA pads 154 on the bottom surface 152 (e.g., 0.5-rum pads on 1.0-mm pitch). The overall thickness of this high density carrier is about 0.8 mm in an example embodiment. The signals are routed to the bottom layers and escape the module 100 through BGA pads 154 (typically 0.5-mm pads on 1.0-mm centers). In the example embodiment of the invention, the dimension of the carrier module is 35 mm×35 mm, similar to typical chip carrier modules. Although these dimensions are significantly larger than required for operation of the transceiver, it demonstrates the potential for using this carrier as a multi-chip module with additional functionality. As further shown in FIG. 2, the carrier 150 incorporates a cutout 159 in the center of the module in the position of the OE array. The cutout enables the optical coupling from the OE array 120 to the waveguides on the Optocard 200.

Optical Coupling Characterization

As further depicted in FIG. 2, the optical system for coupling light from the OE array devices to the waveguides 117 built into the Optocard (or circuit board) 200 is based on a dual-lens optical relay system 101. As described herein, the first lenses are integrated into the backside of the OE devices, while as shown in FIG. 2, the second lens 300 are incorporated with the waveguides 117 and turning mirrors 118 fabricated on the Optocard 200. It is understood that the second lens system 300 are additionally fabricated on the back of a glass, plastic or transparent semiconductor material substrate. By designing these lenses to provide nearly collimated light between the two lenses, greatly relaxed alignment tolerances and enhanced coupling efficiency are provided between the Optomodule 100 and the Optocard 200. The relaxed tolerances can provide greater compatibility with typical board-level package manufacturing tooling. Thus, the lenses radii of curvature are optimized to provide nearly collimated light between the two lenses.

Figure 7:
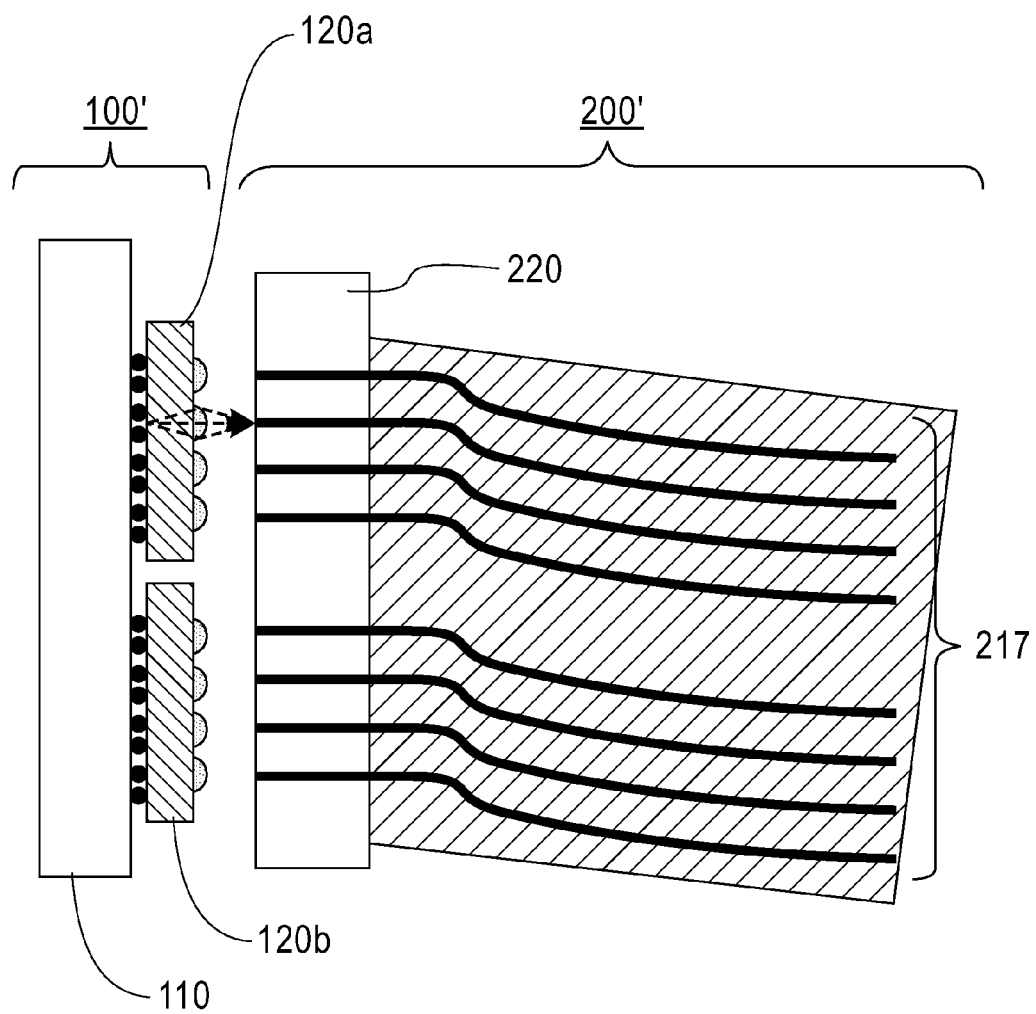

FIG. 7 depicts an alternative embodiment where the Optomodule 100 of the invention is a fiber-coupled transceiver 100' where lenses transfer light from the OE devices to fibers. Specifically, as shown in FIG. 7, in this embodiment, Optocard 200' comprises an optic fiber connector 220 having a fiber array 217 that receive/transmit light signals from/to the OE arrays 120a, 120b. In the embodiment shown in FIG. 7, the fiber connector does not include a second lens array. In this single-lens optical relay system, the OE lens is designed to image the OE devices onto the optical fibers. In another embodiment, although not shown, the fiber connector 220 includes the lens array 300 completing the dual lens system.

In sum, the optical transceiver module 100 of the example embodiment of the present invention uses a single-chip CMOS transceiver supporting an aggregate data rate of 160 Gb/s with sixteen receiver and sixteen transmitter channels that each operate at 10 Gb/s with significant margin. On the carrier 150, transmission lines connecting the inputs (outputs) of the IC circuits to the carrier probe pads allow access to all channels. All 16 transmitter channels and all 16 receiver channels of the transceiver operated error-free. The total core power consumption for both transmitter and is 2.5 W, equivalent to a per-link power dissipation of 15 mW/Gb/s. Thus, the invention provides the first single-chip transceiver capable of channel rates in excess of 10 Gb/s and achieves the highest area efficiency (9.4 Gb/s/mm$^2$) of any parallel optical transmitter, receiver, or transceiver currently available.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention.

Having thus described our invention, what we claim as new, and desire to secure by Letters Patent is:

1. An apparatus for communicating high speed optical signals comprising:
   an optical signal communications device comprising a plurality of optical signal carrier means for communicating respective optical signals;
   an optical transceiver module comprising:
      a single integrated circuit (IC) including an optical transceiver having a first array of receiver/amplifier circuits adapted for receiving and amplifying detected optical signals, and a second array of driver circuits for use in generating optical signals for output transmission via said optical signal communications device,
      an optoelectronic (OE) module comprising a first array of photodetector (PD) devices formed on a transparent substrate for detecting optical signals received via said optical signal communications device, and a second array of laser diode (VCSELs) devices formed on a transparent substrate for generating optical signals for output to said optical signal communications device; said optoelectronic module flip-chip attached to said single IC to form an IC-OE assembly; and a chip carrier assembly for flip-chip mounting said IC-OE assembly to form an optical transceiver module, said optical transceiver module mounted to said optical signal communications device; and, a dual lens optical coupling system comprising:
  a first lens array of lens elements formed at the back of said substrate corresponding to and aligned with each respective said PD and VCSEL devices; and,
  a second lens array of lens elements formed at said optical signal communications device corresponding to and aligned with a respective one of said plurality of optical signal carrier means,
wherein each respective lens array element of said second lens array is further in alignment with a respective lens array element of said first lens array for coupling optical signals between said optical transceiver module and said optical signal communications device.

2. The apparatus as claimed in claim 1, wherein said first array of optical signal detector devices comprises an array of photodetector (PD) elements for receiving said optical signals, said first array of optical signal detector devices corresponding to said first array of receiver/amplifier circuits.

3. The apparatus as claimed in claim 2, wherein a photodetector element is formed on a semiconductor substrate that is transparent to the signal wavelength.

4. The apparatus as claimed in claim 2, wherein a photodetector element is formed on a semiconductor substrate and attached to a further transparent substrate comprising one of: glass or plastic material.

5. The apparatus as claimed in claim 3, wherein said substrate is formed of a material including InP or GaAs.

6. The apparatus as claimed in claim 2, wherein said second array of optical signal emitting devices comprises an array of Vertical-Cavity Surface-Emitting Laser (VCSEL) elements for generating said optical signals, said second array of optical signal emitting devices corresponding to said second array of driver circuits.

7. The apparatus as claimed in claim 6, wherein a VCSEL element is formed on a semiconductor substrate that is transparent to the signal wavelength.

8. The apparatus as claimed in claim 6, wherein a VCSEL element is formed on a semiconductor substrate and attached to a further transparent substrate comprising one of: glass or plastic material.

9. The apparatus as claimed in claim 7, wherein said substrate is formed of a material including InP or GaAs.

10. The apparatus as claimed in claim 3, wherein each element of said array of PD elements is electrically coupled to a corresponding amplifier circuit of said a first array of receiver/amplifier circuits.

11. The apparatus as claimed in claim 7, wherein each element of said array of VCSEL elements is electrically coupled to a corresponding driver circuit of said second array of driver circuits.

12. The apparatus as claimed in claim 7, wherein said array of receiver amplifier circuits and corresponding array of PD elements each comprises a 4×4 array, providing 16 optical signal receive channels.

13. The apparatus as claimed in claim 12, wherein said second array of driver circuits and corresponding array of VCSEL elements each comprises a 4×4 array, providing 16 optical signal transmit channels.

14. The apparatus as claimed in claim 13, wherein each said optical signal receive and transmit channels operate at 10 Gbits/sec providing a 160 Gb/sec bidirectional aggregate data rate.

15. The apparatus as claimed in claim 1, wherein said chip carrier assembly for flip-chip mounting said IC-OE assembly to form said optical transceiver apparatus includes a cutout portion for accommodating said flip-chip placement of said OE module and enabling alignment of said first and second lens arrays with said lens array corresponding to each optical signal carrier means.

16. The apparatus as claimed in claim 15, wherein aligned lens elements of said first lens array and second lens array are in a staggered configuration.

17. The apparatus as claimed in claim 15, wherein said first array of receiver/amplifier circuits generate one of single-ended or dual-ended (differential) signal outputs representing received optical signals, and said second array of driver circuits receive one of single-ended or dual-ended (differential) differential signal inputs for use in generating optical signals for output transmission.

18. The apparatus as claimed in claim 17, further comprising:
  conductor means for coupling said single-ended or dual-ended (differential) signal outputs of said first array of receiver/amplifier circuits to a corresponding electrical contacts for communication from said IC to said chip carrier assembly.

19. The apparatus as claimed in claim 17, further comprising:
  conductor means for coupling said single-ended or dual-ended (differential) signal inputs of said second array of driver circuits from corresponding electrical contacts for communication to said IC from said chip carrier assembly.

20. The apparatus as claimed in claim 1, wherein each said plurality of optical signal carrier means comprises an optic fiber.

21. The apparatus as claimed in claim 1, wherein each said plurality of optical signal carrier means comprises an optic waveguide.

22. The apparatus as claimed in claim 1, wherein said optical signal communications device comprises:
  a fiber optic cable connector having one or more optical fibers integrated therein and adapted for mounting said optical transceiver module, a corresponding lens element of said second lens array being aligned with a corresponding integrated optical fiber.

23. The apparatus as claimed in claim 1, wherein said optical signal communications device comprises:
  a circuit card having one or more signal waveguides integrated therein and adapted for mounting said optical transceiver module, a corresponding lens element of said second lens array being aligned with a corresponding integrated waveguide.

24. The apparatus as claimed in claim 1, wherein said optical signal communications device comprises:
  a circuit card having one or more optical fibers integrated therein and adapted for mounting said optical transceiver module, a corresponding lens element of said second lens array being aligned with a corresponding integrated optical fiber.

* * * * *